United States Patent
Gu et al.

(10) Patent No.: US 7,268,849 B2
(45) Date of Patent: Sep. 11, 2007

(54) SPATIAL LIGHT MODULATOR EMPLOYING VOLTAGE GRADIENT PIXELS, AND ASSOCIATED METHODS

(75) Inventors: Dong-Feng Gu, Thousand Oaks, CA (US); Bruce K. Winker, Ventura, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 155 days.

(21) Appl. No.: 11/237,129

(22) Filed: Sep. 28, 2005

(65) Prior Publication Data
US 2007/0069999 A1    Mar. 29, 2007

(51) Int. Cl.
*G02F 1/1345* (2006.01)
*G02F 1/03* (2006.01)

(52) U.S. Cl. ............... 349/152; 349/139; 349/149; 349/202; 359/252; 359/253; 359/254

(58) Field of Classification Search ........ 359/252–254; 349/117, 121, 139, 149, 152, 193, 201, 202
See application file for complete search history.

(56) References Cited

U.S. PATENT DOCUMENTS

| | | | | |
|---|---|---|---|---|
| 5,151,814 A | * | 9/1992 | Grinberg et al. ............ | 349/202 |
| 5,253,033 A | * | 10/1993 | Lipchak et al. ............. | 349/202 |
| 6,456,419 B1 | * | 9/2002 | Winker et al. .............. | 349/202 |
| 6,458,673 B1 | | 10/2002 | Cheung | |
| 6,761,981 B2 | | 7/2004 | Geogang et al. | |
| 6,832,028 B2 | | 12/2004 | Gu et al. | |
| 2002/0187283 A1 | | 12/2002 | Gu et al. | |
| 2004/0067013 A1 | | 4/2004 | Gu et al. | |
| 2004/0135940 A1 | * | 7/2004 | Tsunekawa et al. ......... | 349/139 |

* cited by examiner

*Primary Examiner*—Evelyn A. Lester
(74) *Attorney, Agent, or Firm*—Glenn H. Lenzen, Jr.; Kutak Rock LLP

(57) ABSTRACT

A spatial light modulator has a transmissive window with a transparent conductive film forming a ground plane and a direct drive backplane with a plurality of voltage gradient pixels. Each of the voltage gradient pixels has (a) resistive film, (b) resistive metal conductor frame on a boundary of the resistive film, and (c) conductive metal leads between a substrate of the direct drive backplane and the resistive metal frame. Differential voltages applied to the metal frame via the conductive metal leads generate a selective two-dimensional linear voltage gradient across the resistive film. A layer of liquid crystal material is disposed between the transmissive window and the voltage gradient pixels. Liquid crystal material of each voltage gradient pixel is responsive to an electric field generated by the voltage gradient to two-dimensionally alter phase of a wavefront incident thereon.

20 Claims, 5 Drawing Sheets

SPATIAL LIGHT MODULATOR EMPLOYING VOLTAGE GRADIENT PIXELS, AND ASSOCIATED METHODS

BACKGROUND

A prior art liquid crystal spatial light modulator (LCSLM) may be formed of liquid crystal (e.g., nematic) material sandwiched between two conductive films (at least one of which is transparent). If one of the conductive films is pixilated and electrically addressable, an electric field may be individually generated through the liquid crystal material at any selected pixel, to change the effective refractive index of the liquid crystal in that pixel. In this manner, selective phase change may be imparted to a wavefront transmitted through the liquid crystal material according to the induced phase retardation caused by the array of pixels. The amount of phase change is, approximately, linearly proportional to the applied voltage, typically within 30-50% of the total possible phase change region.

For the prior art LCSLM, voltage applied to a pixel is constant within the pixel; therefore, the induced phase change within a pixel is also constant. Accordingly, each pixel is decoupled from neighboring pixels and the wavefront generated from the LCSLM exhibits characteristics of "piston" type (stepwise) error. Still, absolute calibration is easy to implement for these LCSLM devices and they are suitable for feed-forward adaptive optics applications.

But use of the prior art LCSLM to simulate a continuous wavefront generates small but non-negligible wavefront errors. To achieve Strehl ratios above 0.8, the phase gradient in adjacent pixels must be small. To reduce the wavefront errors, the prior art LCSLM must also utilize a high number of pixels in order to correct wavefront distortion with high dynamic range or the high amplitude of phase distortions. Increasing the number of pixels increases the size, weight and power of the LCSLM controller, further reducing optical efficiency because of reduced pixel fill factor and thereby limiting the LCSLM's laser power handling capability.

Piston type wavefront is also not commonly detected. For example, a frequently used Shack-Hartmann sensor detects wavefront by sensing wavefront slope and then reconstructing the wavefront; if it is used to detect the piston type wavefront, a precise spatial registration between SLM pixels and the lenslet array in the sensor is required. Interferometry may also be used to detect phase difference between a reference beam and the wavefront to be measured; but sophisticated optics is required to generate a local oscillator.

U.S. Pat. No. 6,458,673, U.S. Pat. No. 6,761,981, U.S. Pat. No. 6,832,028 and U.S. Patent Publication Nos. 2004/0067013 and 2002/0187283 are incorporated herein by reference.

SUMMARY

In an embodiment, a spatial light modulator has a transmissive window with a transparent conductive film and a direct drive backplane having a plurality of voltage gradient pixels. Each of the voltage gradient pixels has (a) resistive film, (b) resistive metal conductor frame on a boundary of the resistive film, and (c) conductive metal leads between a substrate of the direct drive backplane and the resistive metal frame. Differential voltages applied to the metal frame via the conductive metal leads generate a selective two-dimensional linear voltage gradient across the resistive film. A layer of liquid crystal material is disposed between the transmissive window and the voltage gradient pixels. Liquid crystal material of each voltage gradient pixel is responsive to an electric field generated by the voltage gradient to two-dimensionally alter phase of a wavefront incident thereon.

In one embodiment, a method corrects wavefront distortion by: forming an array of pixels adjacent to liquid crystal material, each of the pixels having resistive film; and applying voltages to four corners of the resistive film, for each of the pixels, such that liquid crystal material adjacent the resistive film imparts a two-dimensional phase gradient to a wavefront within the liquid crystal material, to correct distortion of the wavefront.

A method steers a wavefront by: forming an array of pixels adjacent to liquid crystal material, each of the pixels having resistive film; and applying voltages to four corners of the resistive film, for each of the pixels, such that the liquid crystal material imparts a phase gradient to a wavefront within the liquid crystal material, to selectively steer the wavefront.

DETAILED DESCRIPTION OF THE FIGURES

Figure 1:
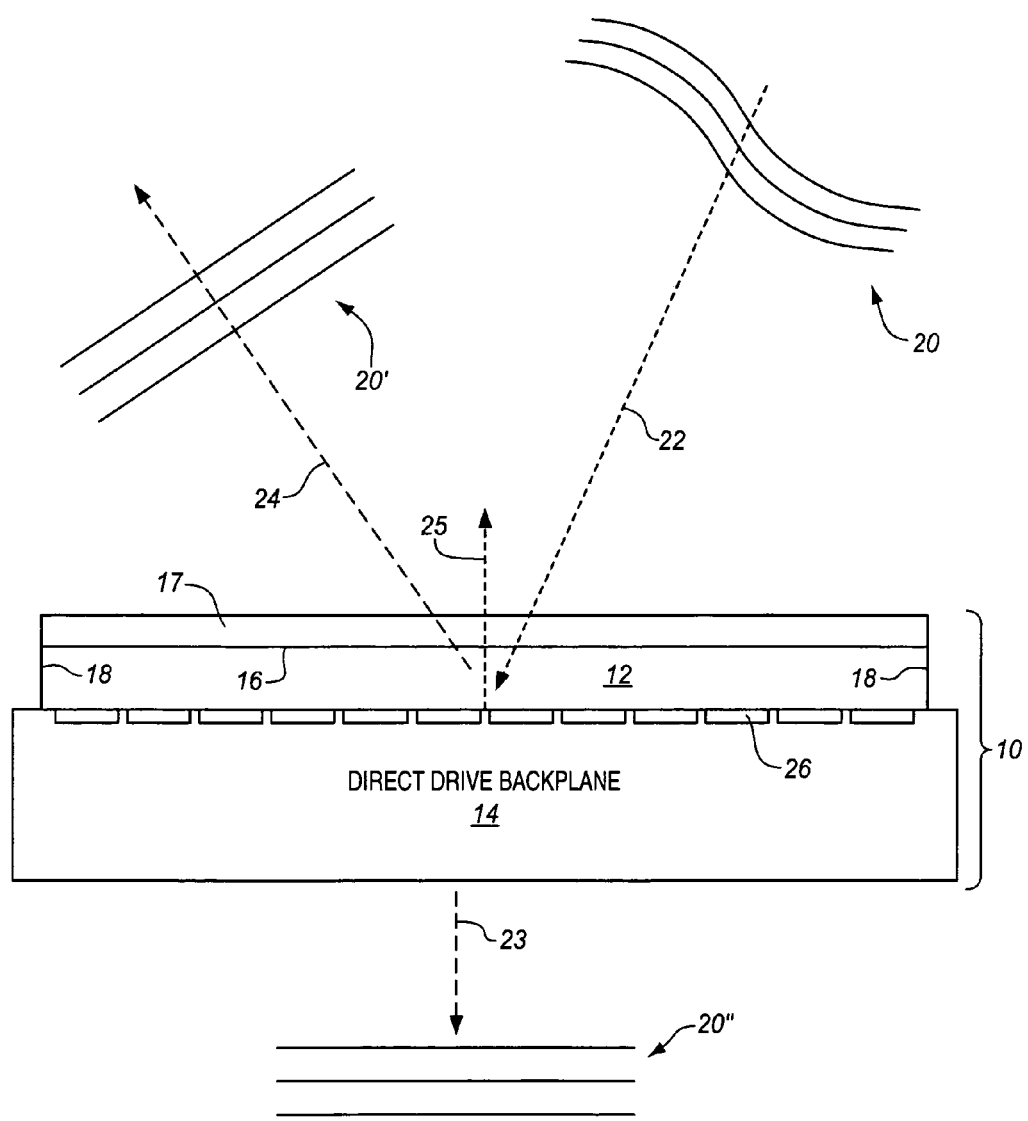
FIG. 1 shows one spatial light modulator employing voltage gradient pixels, in accord with an embodiment.

FIG. 1 shows one spatial light modulator 10 that employs voltage gradient pixels 26. Liquid crystal material 12 is disposed between a direct drive backplane 14 and a transparent window 17. Transparent window 17 has a transparent conductive film 16 coated on one side that serves as a continuous ground plane for modulator 10; transparent conductive film 16 may thus connect to direct drive backplane 14 via ground-activated bus lines 18. As described in more detail below, each individual voltage gradient pixel 26 is electrically addressable through operation of direct drive backplane 14. A voltage gradient across each pixel of direct drive backplane 14 thereby determines the electric field through an associated segment of liquid crystal material 12, as described in connection with FIG. 2.

In operation, a wavefront 20 is incident upon modulator 10, such as along light path 22. Wavefront 20 is shown with a wavy appearance to indicate distorted phase in this example. Upon reflection from modulator 10, for example along light path 24, the wavefront (shown after reflection as wavefront 20') is shown with straight lines, indicating that the distortions are removed from the wavefront. This distortion correction is accomplished by the application of two-dimensional voltage gradients applied selectively to individual pixels 26 of direct drive backplane 14.

Figure 2:
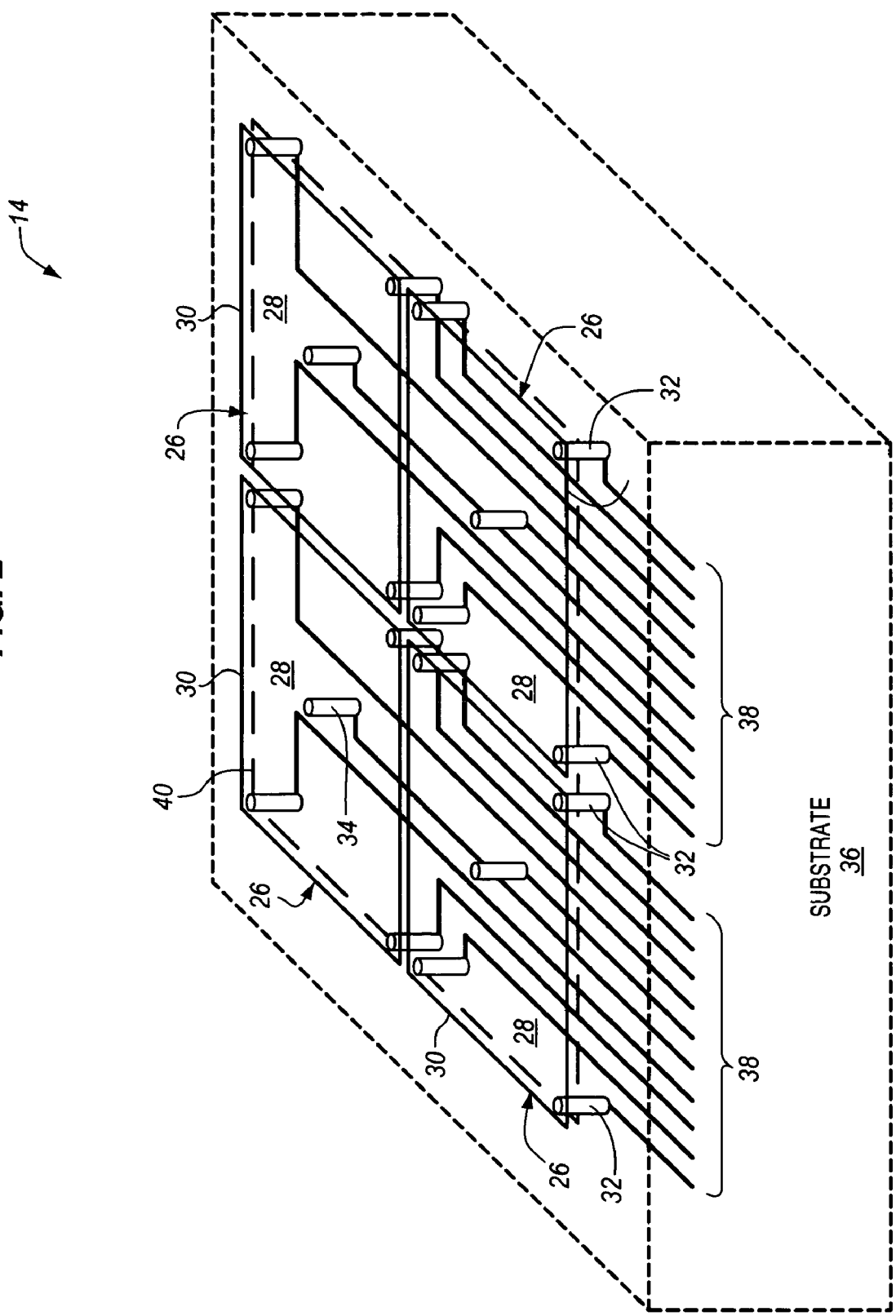
FIG. 2 illustrates one direct drive backplane in accord with an embodiment.

FIG. 2 shows one direct drive backplane 14 illustratively shown with four voltage gradient pixels 26 (more pixels may be part of backplane 14 without departing from the scope hereof). Each pixel 26 is formed with a resistive film 28 with relatively high sheet resistivity (e.g., zinc oxide (ZnO) or other metal oxide films) between a resistive metal conductor frame 30. For each voltage gradient pixel 26, four conductive metal leads 32 connect to resistive metal conductor frame 30 at the corners thereof, as shown; a center conductive metal lead 34 may additionally connect with a center of the pixel 26 for enhanced voltage control.

Support and integration of voltage gradient pixels 26 is provided by a substrate 36. A plurality of bus lines 38 connect to conductive metal leads 32 such that control signals applied to bus lines 38 produce a desired two-dimensional voltage gradient in each pixel 26. A dielectric insulating layer 40 may be used to separate and insulate resistive film 28 from bus lines 38; in this case, conductive metal leads 32 may extend through via holes in the insulating layer 40 to provide electrical connection.

In the reflective example shown in FIG. 1, a dielectric mirror (not shown) may be applied on top of resistive film 28 when modulator 10 is used in high energy laser applications, to increase the optical efficiency and protect resistive film 28 from laser induced damage. Alternatively, if resistive film 28 is reflective to wavefront 20 and durable to laser illumination, such a dielectric mirror is not required in the reflective mode.

Modulator 10, FIG. 1, and direct drive backplane 14, FIG. 2, are shown illustratively and are not necessarily to scale. The electrical resistance of resistive film 28, resistive metal conductor frame 30, and conductive metal leads 32 may be chosen so that the differential voltages applied to conductive metal leads 32 generates, selectively, the two-dimensional linear voltage gradient across resistive film 28 of each pixel. Liquid crystal material 12, FIG. 1, of the pixel responds to an electric field generated by the voltage gradient to two-dimensionally alter phase of a wavefront incident thereon. Each pixel thus provides a unique, local wavefront tilt with the wavefront normal pointing to any desired azimuth angles and finite polar angles; different local wavefront tilts for individual pixels form a two-dimensionally altered phase front. See, e.g., FIG. 3.

Thus, within a certain voltage range, the linear voltage gradient in a pixel 26 produces a linear phase gradient to a segment of wavefront 20, as the result of the molecular reorientation effect of an electric field in liquid crystal material 12 to affect refractive index change. With properly selected voltage values applied to the four metal leads 32, a linear voltage gradient from any point on one edge of a pixel to any point of any of the other three edges of the same pixel forms the two dimensional linear voltage gradient on resistive film 28; voltage applied to center conductive metal lead 34 may be used to "fine tune" the voltage gradient. Maintaining linearity or selection of resistance and voltage values serves to reduce resulting wavefront errors.

In an embodiment, there are three levels of the electrical resistance values for the conductive materials in establishing the two-dimensional linear voltage gradient in a pixel; and to ensure non-linearity less than one percent, each level is two to four orders of magnitude different from the other. For example, resistive film 28 may exhibit the highest resistivity in a range from about fifty to a few hundred kΩ per square. Resistive metal frame 30 may be formed of gold wires, each with a cross-sectional profile of 2 μm×0.02 μm, exhibiting resistivity of about 500 Ω/mm. Bus line 38 may be formed by gold wires that have a cross-sectional profile of 20×1 μm, exhibiting resistivity of about 1 Ω/mm. For better processibility, metal leads 32 and 34 may have a cross section of 20×20 μm; but this dimensioning is not critical since they have very short length (~2 μm).

Substrate 36 may comprise very large scale integration (VLSI) circuitry to drive signals onto bus lines 38 and generate voltage gradients across pixels 26. The film resistivity of transparent conductor film 16 on window 17 may be in the range of 200-1000 Ω per square. With a conductive gold ring (not shown) positioned to surround the optical aperture, film resistivity in this range will not greatly affect the voltage linearity.

Figure 3:
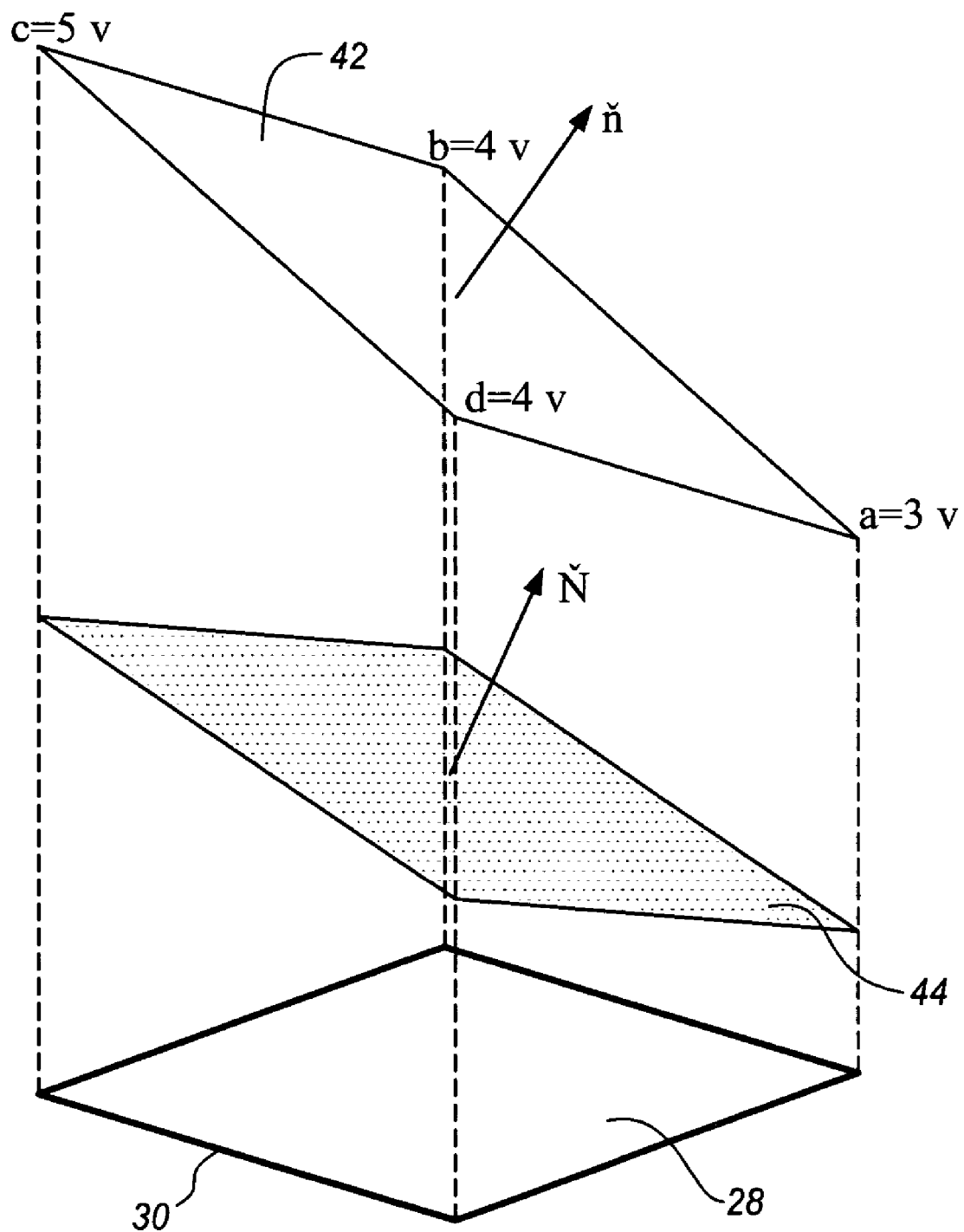
FIG. 3 illustrates a two-dimensional linear voltage gradient created by applying four selected voltages to the four corners of a pixel.

An example of generating a two-dimensional linear voltage gradient is illustrated in FIG. 3, in which the four voltage values applied to four corners of resistive film 28 (or the four corners of the metal frame 30) of a pixel are 3.0, 4.0, 5.0 and 4.0 volts, at corners a, b, c and d, respectively. The voltage values on resistive film 28 form a straight tilted plane 42. The direction of plane normal ñ depends on the four voltage values and it covers the 360° azimuth angle range. Since the relative phase change imparted to a wavefront is proportional to the voltage difference, the phase front reflected from this pixel is also a straight linear plane 44, and the surface normal Ñ of the phase front reflected from this pixel depends on the four voltage values. The polar angle of Ñ is determined by the ratio between the optical path length difference within the pixel and the pixel dimension, and the azimuth angle of Ñ is the same as that of ñ. If the four voltage values change to 3, 3, 5 and 5 volts for corners a, b, c and d, respectively, the polar angle of Ñ will be increased by a factor of 40% and the azimuth angle will change by 45°. Therefore, by selection of the four voltage values applied on the four corners of a pixel, the tilting direction of the wavefront reflected from or transmitted through the pixel is controllable with a single liquid crystal layer in a spatial light modulator.

Referring again to FIG. 1, direct drive backplane 14 may be transparent, in an embodiment, so that wavefront 20 transmits through direct drive backplane 14, for example along light path 23, and without substantial reflection. In this embodiment, therefore, bus lines 38 may be positioned in the gaps separating pixels 26 so that they are non-interfering with the transmitted wavefront (shown as wavefront 20") through each pixel; the separation gaps may also be masked to lessen interfering effects to wavefront 20". Wavefront 20" may then also be substantially free of distortion when properly controlled by the phase gradients induced by direct drive backplane 14 across pixels 26. In this transmissive mode, a fill factor higher than 90% is achievable with about one hundred and fifty pixels 26.

It should be apparent that modulator 10 with direct drive backplane 14 may also be used to "steer" wavefront 20 instead of, or in addition to, correcting wavefront distortion. For example, imparting graduated (e.g., linear) phase change across wavefront 20 operates to tip and/or tilt the reflected or transmitted wavefront. More particularly, through control of phase gradients applied by pixels 26, wavefront 20 may be steered within a solid angle centered about the surface normal 25 to a planar surface of pixels 26 (assuming all pixels align to this plane), so that the wavefront can be three-dimensionally steered. In FIG. 1, for example, transmitted wavefront 20" from each pixel is steered from an incidence angle Φ, relative to surface normal 25 of pixels 26, to a direction 23 that is parallel with normal 25.

Figure 4:
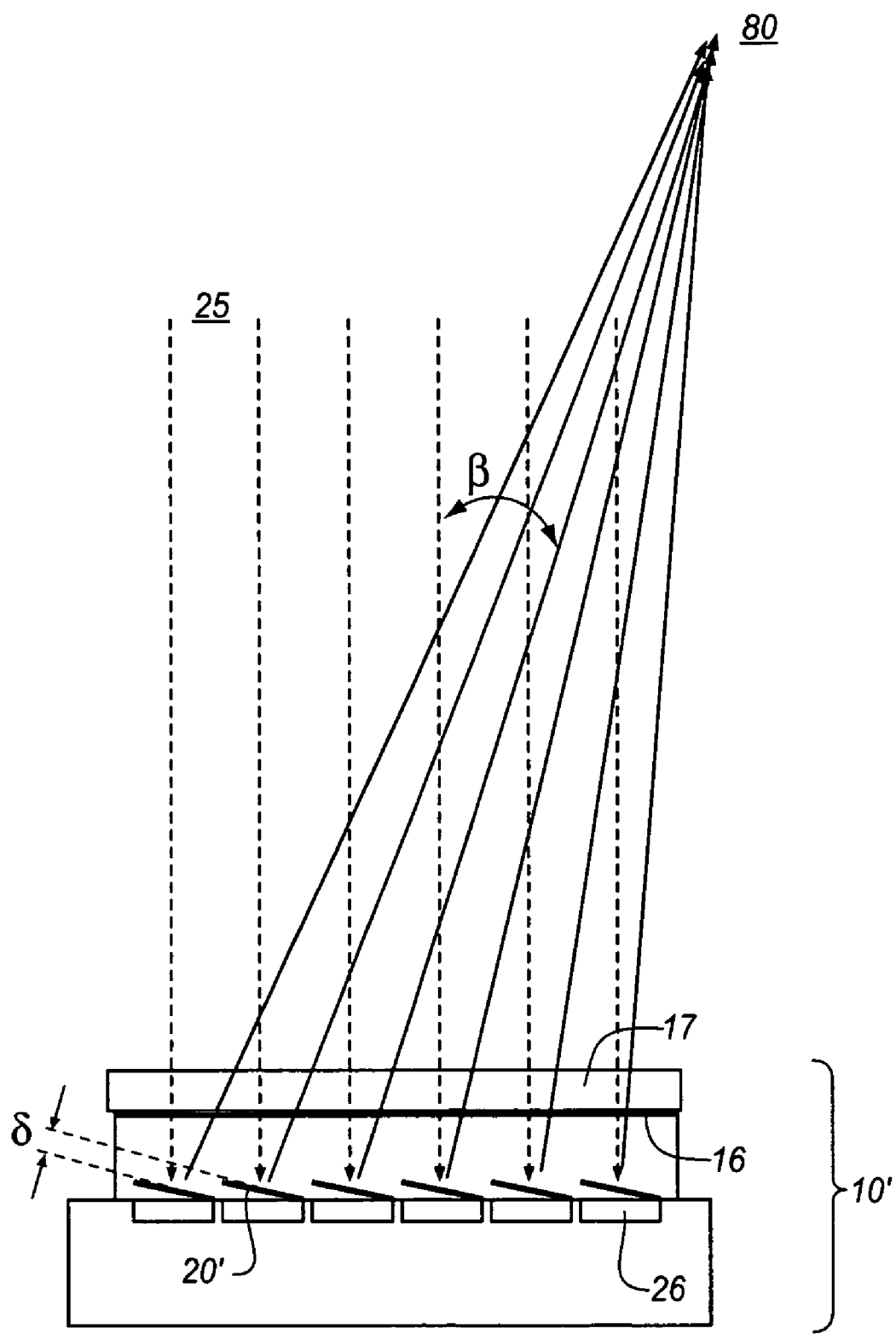
FIG. 4 shows one spatial light modulator employing voltage gradient pixels that usefully steers a wavefront with reduced far field interference.

FIG. 4 illustrates another spatial light modulator 10' used in a beam steering application. Since the number of pixels 26 is finite, the interference between different pixels due to the phase step δ may cause beam intensity to fluctuate spatially in the far field 80. Since it is desirable to eliminate this interference at any angle in the far field, we may add a pre-determined uniform phase step δ±2nπ (n is an integer)

to each pixel 26, such as shown. The added step height in each pixel 26 depends on the pixel location and the steered angle. With this arrangement, the contribution from each pixel in far field 80 is in-phase, avoiding the need to employ another pixilated phase compensator. For example, at a steering angle β, exemplary voltage values used at the four corners of two pixels "A" and "B" are 3.0, 4.0, 5.0 and 4.0 volts, but the phase fronts from pixels A and B in the far field differ by λ/16 (δ=λ/16), which corresponds to a 0.2 volt voltage step (difference). This is then resolved by applying 3.0, 4.0, 5.0 and 4.0 volts to pixel A, and 3.2, 4.2, 5.2 and 4.2 volts to pixel B.

Implementing this additional piston type phase change to individual pixels means that the pixel's liquid crystal material is thick enough to provide at least a linear phase range of 4π (2π within a pixel for the phase tilt and ±π for the piston type phase compensation). Use of thicker liquid crystal material reduces the switching speed of the spatial light modulator. In practice, a dual frequency addressing scheme may be employed to enhance switching speed.

In an embodiment, direct drive backplane 14, FIG. 1, comprises a VLSI circuit, which may be configured to perform certain of the functions herein. For example, such a VLSI backplane 14 may be configured to deliver drive voltages to conductive metal leads 32 to form the voltage gradient across each pixel, to impart the desired phase change to wavefront 20. Alternatively, direct drive backplane 14 may be commanded by a controller or system computer to perform like functions.

Certain advantages may be realized by the spatial light modulator described herein. In one example, the size of metal frame 30 may be configured in the reflective mode (illustrated by wavefront 20' in FIG. 1) so that a fill factor of modulator 10 exceeds 98%. In another example, in comparison to the prior art LCSLM, modulator 10 may for example utilize up to 75% fewer pixels to achieve the same Strehl ratio of 0.8 for the same dynamic range of the phase amplitude. Or it may achieve four times higher dynamic range using the same number of pixels as compared to the prior art LCSLM. Use of voltage gradient pixels may also increase the spatial resolution of a system employing modulator 10. Moreover, fabrication of direct drive backplane 14 may be accomplished through conventional fabrication processes.

Finally, the number of channels used to electronically control modulator 10 may be a factor of four fewer than the control channels used in the prior art LCSLM. In particular, each pixel in modulator 10 uses at least four channels. For a prior art LCSLM with thirty-two pixels across its aperture (812 channels), the largest correctable phase amplitude is four waves. On the other hand, modulator 10 with sixteen pixels across its aperture needs only about 800 channels (~200 pixels) and the largest correctable phase amplitude is sixteen waves, which corresponds to the aforementioned 400%.

The spatial light modulator thus presented has particular use in fields of free space laser communications (e.g., as adaptive optics for such communications), target designation and tracking, wavefront simulation for configuration and testing, and certain high energy laser applications.

Figure 5:
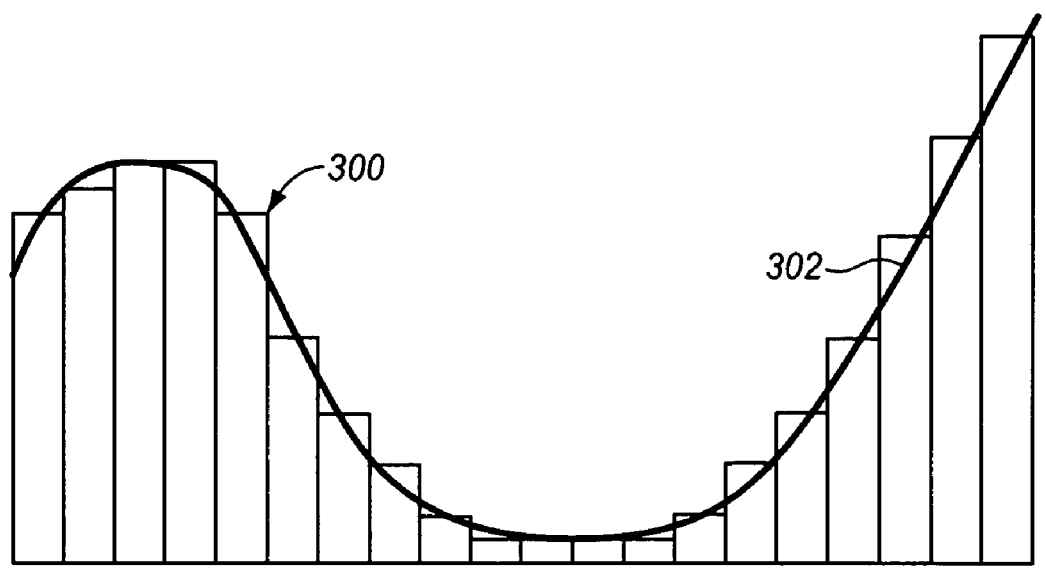
FIG. 5 graphically depicts wavefront error produced by a prior art liquid crystal spatial light modulator.
Figure 6:
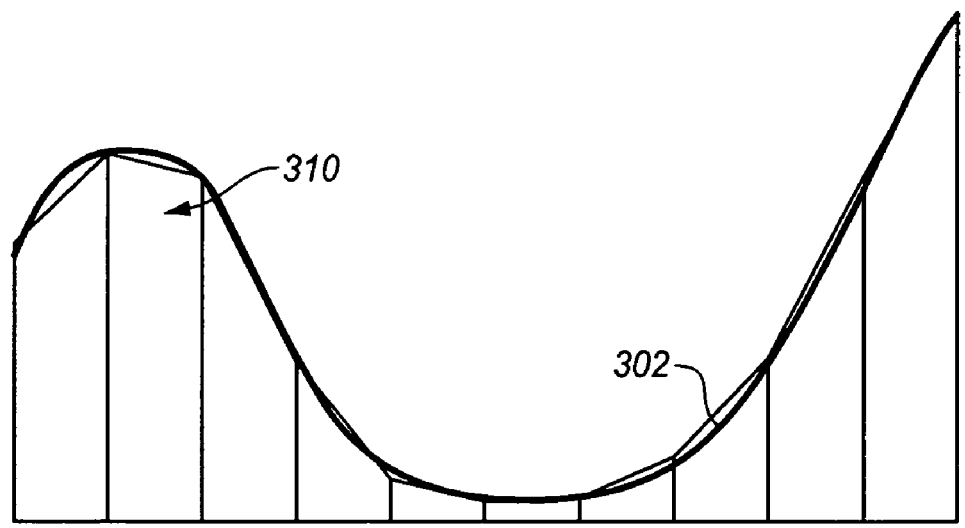
FIG. 6 graphically depicts wavefront error produced by a spatial light modulator employing voltage gradient pixels.

FIG. 5 illustratively shows how piston-type wavefront error is produced when using a prior art LCSLM to simulate a desired wavefront. The waveform 300 produced by the LCSLM differs from the desired waveform 302 according to the step-wise approximations induced by pixels of the LCSLM. By way of comparison, FIG. 6 illustrates a waveform 310 formed by spatial light modulator 10, FIG. 1, using direct drive backplane 14, FIG. 2. Waveform 310 does not differ from desired waveform 302 as much as waveform 300 does, due to the phase gradients achievable within each pixel 26 of direct drive backplane 14; this is also achieved with fewer pixels (e.g., a factor of four less, considering a two-dimensional array). Phase distortions of more than one wavelength may be corrected over the whole aperture of modulator 10 (i.e., the aperture corresponding to the surface area of pixels 26) by using modulo 2π modular reset.

Changes may be made to this application without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A spatial light modulator, comprising:
a transmissive window having a transparent conductive film;
a direct drive backplane having a plurality of voltage gradient pixels, each of the voltage gradient pixels having (a) resistive film, (b) resistive metal conductor frame on a boundary of the resistive film, and (c) conductive metal leads between a substrate of the direct drive backplane and the resistive metal frame, wherein differential voltages applied to the metal frame via the conductive metal leads generate a selective two-dimensional linear voltage gradient across the resistive film; and
a layer of liquid crystal material disposed between the transmissive window and the voltage gradient pixels;
the liquid crystal material of each voltage gradient pixel responsive to an electric field generated by the voltage gradient to two-dimensionally alter phase of a wavefront incident thereon.

2. The modulator of claim 1, wherein the differential voltages are applied to four corners of the metal conductor frame.

3. The modulator of claim 1, the conductive metal leads of each voltage gradient pixel comprising four conductive metal leads, each of the four conductive metal leads coupling between a corner of the voltage gradient pixel and the substrate.

4. The modulator of claim 1, further comprising a dielectric mirror disposed between the liquid crystal material and the plurality of voltage gradient pixels, wherein the wavefront reflects from the modulator.

5. The modulator of claim 1, the resistive film and the substrate being transmissive to electromagnetic energy forming the wavefront such that the modulator transmits the wavefront therethrough.

6. The modulator of claim 1, the resistive film being reflective to the wavefront, wherein the wavefront reflects from the modulator.

7. The modulator of claim 1, further comprising a plurality of bus lines disposed with the substrate and coupled to the conductive metal leads, for controlling voltages to the resistive metal conductor frame.

8. The modulator of claim 7, further comprising a dielectric layer disposed between the resistive film and the bus lines.

9. The modulator of claim 8, the dielectric layer forming vias for the conductive metal leads.

10. The modulator of claim 1, wherein, for each of the pixels, the conductive metal leads comprise four conductive metal leads, each of the four conductive metal leads coupled to a corner of one voltage gradient pixel, wherein differential voltages applied to the four conductive metal leads generate a selective voltage gradient across the resistive film.

11. The modulator of claim 1, wherein the wavefront is one or both of tipped and tilted upon passing through the liquid crystal material and in response to voltage gradients of the pixels, to steer the wavefront.

12. A method for correcting wavefront distortion, comprising:

forming an array of pixels adjacent to liquid crystal material, each of the pixels having resistive film; and applying voltages to four corners of the resistive film, for each of the pixels, such that liquid crystal material adjacent the resistive film imparts a two-dimensional phase gradient to a wavefront within the liquid crystal material, to correct distortion of the wavefront.

13. The method of claim 12, the step of applying voltages comprising applying voltage levels to bus lines connected to conductive metal leads at each corner of each resistive film.

14. The method of claim 12, wherein the resistive film is transmissive to the wavefront, wherein the step of applying voltages comprises imparting the two-dimensional phase gradient to the wavefront to correct distortions for a wavefront transmitted through the liquid crystal material and the resistive film.

15. The method of claim 12, wherein the step of applying voltages comprises imparting the two-dimensional phase gradient to the wavefront to correct distortions for a wavefront reflected from a dielectric mirror between the resistive film and the liquid crystal material.

16. A method for steering a wavefront, comprising:

forming an array of pixels adjacent to liquid crystal material, each of the pixels having resistive film; and applying voltages to four corners of the resistive film, for each of the pixels, such that the liquid crystal material imparts a phase gradient to a wavefront within the liquid crystal material, to selectively steer the wavefront.

17. The method of claim 16, the step of applying voltages comprising applying voltage levels to bus lines connected to conductive metal leads at each corner of each resistive film.

18. The method of claim 16, wherein the step of applying voltages comprises applying different voltage biases to different pixels, to suppress far field interference.

19. The method of claim 16, wherein the resistive film is transmissive to the wavefront, wherein the step of applying voltages comprises imparting the phase gradient to the wavefront to steer a wavefront transmitted through the liquid crystal material and the resistive film.

20. The method of claim 16, wherein the step of applying voltages comprises imparting the phase gradient to the wavefront to steer a wavefront reflected from a dielectric mirror between the resistive film and the liquid crystal material.

* * * * *

UNITED STATES PATENT AND TRADEMARK OFFICE
CERTIFICATE OF CORRECTION

PATENT NO. : 7,268,849 B2 Page 1 of 1
APPLICATION NO. : 11/237129
DATED : September 11, 2007
INVENTOR(S) : Dong-Feng Gu and Bruce K. Winker It is certified that error appears in the above-identified patent and that said Letters Patent is hereby corrected as shown below:

In column 1, line 5 (following the title and preceding the heading "Background"), the following government rights statement should be inserted:

--This invention was made with Government support under Contract DTRA01-02-C-0030 awarded by the Defense Threat Reduction Agency. The Government has certain rights in this invention.--

Signed and Sealed this

Seventh Day of October, 2008

JON W. DUDAS
*Director of the United States Patent and Trademark Office*